No. 878,836. PATENTED FEB. 11, 1908.
E. D. TRICKEY.
SECURING DEVICE FOR TROLLEYS.
APPLICATION FILED APR. 17, 1907.

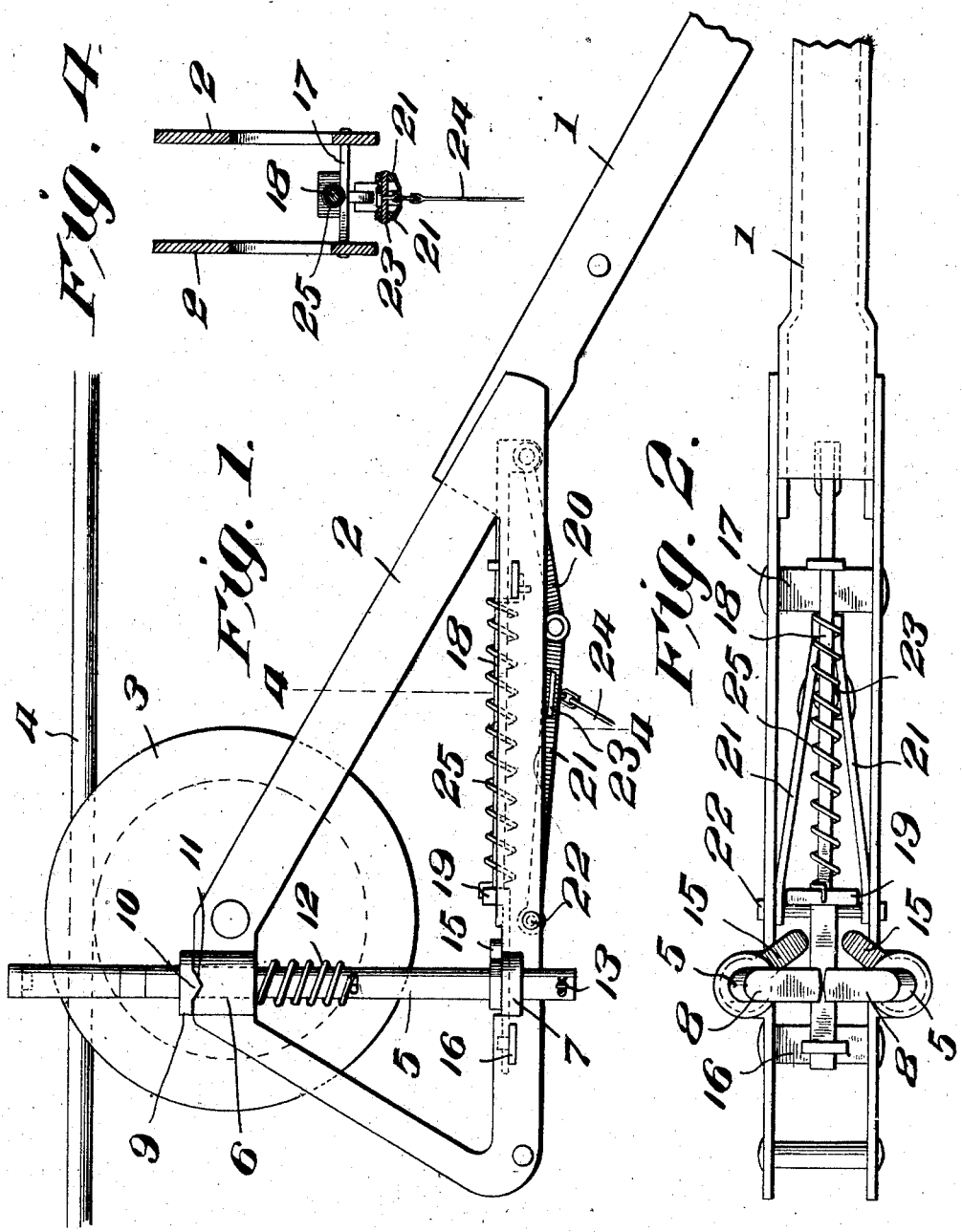

2 SHEETS—SHEET 2.

WITNESSES:
Thos. W. Riley
J. W. Fitzgerald

INVENTOR
E. D. Trickey
By W. J. FitzGerald & Co.
Attorneys

UNITED STATES PATENT OFFICE.

EBERLE D. TRICKEY, OF BLANCHESTER, OHIO.

SECURING DEVICE FOR TROLLEYS.

No. 878,836.  Specification of Letters Patent.  Patented Feb. 11, 1908.

Application filed April 17, 1907. Serial No. 368,661.

*To all whom it may concern:*

Be it known that I, EBERLE D. TRICKEY, a citizen of the United States, residing at Blanchester, in the county of Clinton and State of Ohio, have invented certain new and useful Improvements in Securing Devices for Trolleys; and I do hereby declare the following to be a full, clear, and exact description of the invention, such as will enable others skilled in the art to which it appertains to make and use the same.

My invention relates to new and useful improvements in trolleys, and more particularly to that class adapted to be used in connection with street cars, or like propelled vehicles, and my object is to provide means for positively holding the trolley wheel in engagement with the trolley wire.

A further object is to provide means to readily attach or remove the trolley wheel from position on the wire.

Other objects and advantages will be hereinafter referred to and more particularly pointed out in the claims.

Figure 3:
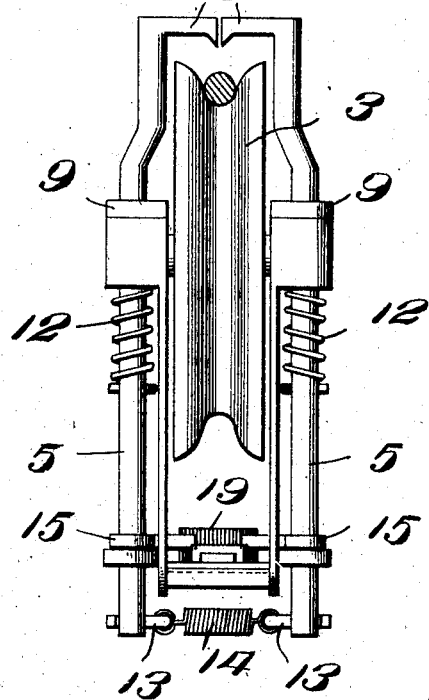
Figures 7, 8:
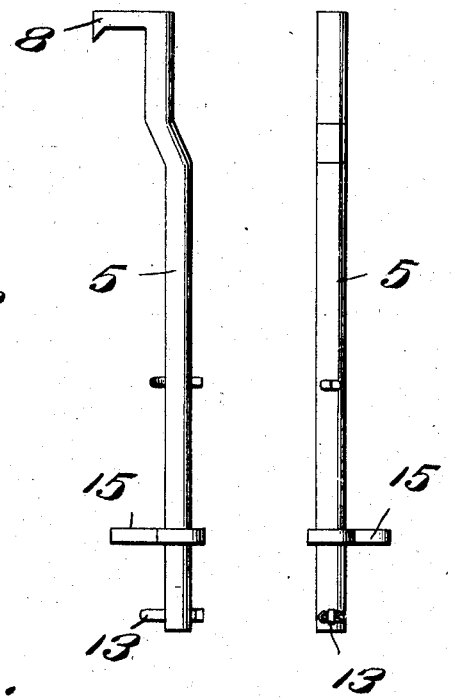
Figure 6:
Figure 5:
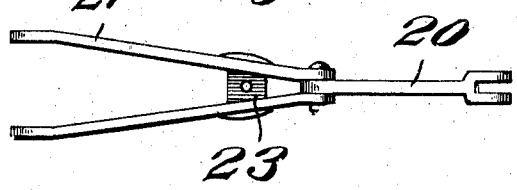

In the accompanying drawings, which are made a part of this application, Figure 1 is a side elevation of a portion of a trolley pole and trolley wheel showing my improved attachment secured thereto. Fig. 2 is a top plan view thereof, with the trolley wheel removed. Fig. 3 is a rear elevation thereof. Fig. 4 is a detail sectional view, as seen on line 4—4, Fig. 1. Figs. 5 and 6 are plan views of different parts of the operating device removed from position, and, Figs. 7 and 8 are side and edge elevations, respectively, of the device employed for holding the trolley on the trolley wire.

Referring to the drawings in which similar reference numerals designate corresponding parts throughout the several views, 1 indicates the usual form of trolley pole, which is preferably secured to the roof of the car, and has secured thereto the usual form of tension spring, (the car and spring not shown).

Secured to the upper end of the trolley pole 1 is a frame 2 between the sections of which is rotatably mounted the usual form of trolley wheel 3, the frame 2 being substantially triangular in general outline, and having the trolley wheel secured at the apex thereof.

It is a well known fact that considerable difficulty is encountered from the trolley wheel leaving the trolley or feed wire 4, and to this end I provide means for positively holding the trolley wheel into engagement with the feed wire, which consist of a pair of vertically disposed shafts 5, the upper ends of which are directed through sockets 6 on the frame 2, while the lower ends thereof extend through ears 7 on the lower portion of the frame 2, said shafts being so arranged that they will rotate as well as move longitudinally through the sockets and ears.

The extreme upper ends of the shafts 5 are provided with substantially L-shaped arms 8, which, when the shafts are in their normal position, extend over the trolley wheel 3, and have their ends in juxtaposition to each other, so that the trolley wheel 3 will be prevented from leaving the feed wire as long as the arms are adjacent each other and the arms are held in this position, and the shafts prevented from casual rotation by providing a collar 9 for each of the shafts 5, on the lower faces of which are substantially V-shaped lugs 10, which normally rest in a notch 11 formed in the upper end of the sockets 6, and the shafts are held in their lowered position, under tension, by fixing one end of a spring 12 to the shafts and disposing the opposite end thereof into engagement with the lower end of the sockets 6. The tension of the spring 12, therefore, will always seat the lug 10 if the arms 8 are not turned sufficiently to entirely remove the lug from engagement with the notches. If, however, the arms are turned sufficiently to disengage the lug from the notches, I provide means at the lower ends of the shafts to positively rotate the shafts in one direction, and cause the lug to engage the notch, and in this connection I direct bolts 13 through the lower ends of the shafts 5, and in line with the laterally extending arms 8 and secure between the ends of the bolts 13 a spring 14, so that when the shafts are rotated to swing the arms 8 from over the trolley, tension will be exerted on the spring 14, which will result in rotating the shafts and returning the arms to their initial position over the trolley as soon as the shafts have been released.

In order to positively rotate the shafts 5 and cause the arms 8 to swing from over the feed wire 4, I secure to the shafts 5, and at a point immediately above the ears 7, fingers 15, said fingers extending inwardly and towards the forward end of the frame 2 when the shafts 5 are in their normally closed position, and in order to engage the fingers and direct pressure thereon to rotate the shafts and swing the arms from over the feed wire, I slidably mount upon bearing plates 16 and 17, carried by the base portion of the frame 2, a plunger 18, which is provided at a point adjacent the fingers 15 with a shoulder 19, and when the plunger is moved longitudinally towards the fingers 15 the shoulder 19 will engage the inner ends of the fingers and move the same rearwardly, which will result in rotating the shafts 5 and separating the arms, so that the trolley wheel can be readily removed from the feed wire.

The plunger 18 is operated through the medium of a pitman 20, which is pivotally secured at one end to the forward end of the plunger 18, while the opposite end of the pitman is secured between a pair of links 21, the opposite ends of the links being in turn secured to the base of the frame 2 by directing a bolt, or the like, 22 through the frame and ends of the links.

A bar 23 is secured between the links 21 and adjacent their pivotal connection with the pitman 20, and to the bar 23 is secured one end of the usual form of cable 24 employed in placing the trolley wheel upon the feed wire, and it will readily be seen that, as the links 21 are pivotally anchored at one end, when a pull is made upon the cable 24, the links and pitman will act as a hinge, the ends pivoted together, being lowered, so that the plunger will be moved longitudinally in its bearings, thereby engaging the shoulder 19 with the fingers 15, the tension of the spring at the lower end of the trolley pole being of sufficient rigidity to cause the pivoted ends of the links and pitman to descend before the trolley wheel will be pulled from the feed wire, and in order to return the plunger and parts secured thereto to their normal positions, I direct around the plunger 18, a spring 25, which is fixed at one end to the plate 17, and at its opposite end to the shoulder 19, so that as soon as the trolley wheel has been seated upon the feed wire, and the pull upon the cable 24 released, the spring will force the plunger forwardly and the shoulder out of engagement with the fingers 15, so that the shafts 5 will rotate and bring the arms 8 in alinement with each other and over the feed wire.

When the plunger 18 is in its normal, forward position, the shafts 5 are left free to rotate except for the engagement of the lugs 10 with the collar 9 and the tension of the spring 14, so that when the arms 11 come into engagement with the usual form of hangers for suspending the feed wire, the arms 8 will swing open sufficiently to pass the hangers, whereupon they will immediately close, and again extend over the feed wire.

It will now be seen that I have provided a very economical and efficient means for positively holding the trolley wheel into engagement with the feed wire, and one that can be readily attached to any form of trolley pole. It will also be seen that I have provided very convenient means for swinging the arms from over the feed wire, so that the trolley wheel can be removed therefrom, if desired.

What I claim is:

1. The herein described securing device for trolleys, comprising the combination with a trolley wheel and a frame therefor; of a pair of shafts rotatably and longitudinally movably mounted on said frame, horizontally disposed arms at the upper ends of the shafts, means on said shafts to engage notches in the frame to normally hold the shafts in a fixed position, fingers adjacent the lower ends of said shafts, and means to engage said fingers and cause the shafts to partially rotate, whereby the arms on the shafts will be separated.

2. The herein described securing means for trolleys, comprising a frame, bearings on said frame, a pair of shafts rotatably mounted in said bearings, horizontally disposed arms at the upper ends of said shafts, means to hold said arms normally suspended over the trolley, fingers adjacent the lower ends of said shafts, bolts extending through said shafts, a tension spring connecting said bolts, whereby the shafts will be returned to their initial positions, and means carried by the frame to engage said fingers and rotate the shafts.

3. The herein described means for securing a trolley wheel to a feed wire, comprising the combination with a frame, having shafts thereon, arms at the upper ends of said shafts adapted to normally extend over the trolley and fingers adjacent the lower ends of said shafts; of a plunger, a shoulder on said plunger adapted to engage said fingers, a pitman secured to one end of said plunger, links at the opposite end of said pitman, and means to direct a downward pull on said links and pitman, whereby the plunger will be moved longitudinally and the shoulder into engagement with said fingers.

4. The herein described means for securing a trolley to a feed wire, comprising a pair of shafts, horizontally disposed fingers at the upper ends of said shafts and normally extending towards each other, a supporting frame for said shafts, said frame having notches therein, a collar for each of said shafts, a lug on said collar adapted to normally rest in said notches, means to normally hold said lugs seated in said notches, and additional means to rotate said shafts, whereby the arms will be separated.

In testimony whereof I have signed my name to this specification in the presence of two subscribing witnesses.

EBERLE D. TRICKEY.

Witnesses:
T. J. WARNING,
A. J. SAVAGE.